(12) United States Patent
Parker

(10) Patent No.: US 6,633,453 B1
(45) Date of Patent: Oct. 14, 2003

(54) SHALLOW RECESSED T-HEAD WITH REDUCED SIDE-WRITING AND METHOD FOR MAKING THE SAME

(75) Inventor: Michael Andrew Parker, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 09/653,758

(22) Filed: Sep. 1, 2000

(51) Int. Cl.$^7$ .............................................. G11B 5/147
(52) U.S. Cl. ...................................................... 360/126
(58) Field of Search ................................ 360/126, 122, 360/317, 318, 121

(56) References Cited

U.S. PATENT DOCUMENTS

| | | |
|---|---|---|
| 5,245,493 A | 9/1993 | Kawabe et al. ............. 360/126 |
| 5,285,340 A | * 2/1994 | Ju et al. ...................... 360/119 |
| 5,402,295 A | 3/1995 | Suzuki et al. ............... 360/126 |
| 5,726,841 A | 3/1998 | Tong et al. .................. 360/122 |
| 5,752,309 A | 5/1998 | Partee et al. ............. 29/603.18 |
| 5,831,792 A | 11/1998 | Ananth ........................ 360/103 |
| 6,122,144 A | * 9/2000 | Chang et al. ............... 360/122 |

FOREIGN PATENT DOCUMENTS

| | | |
|---|---|---|
| JP | 0546934 | 2/1993 |
| JP | 5225521 | 9/1993 |
| JP | 1175914 | 7/1999 |

OTHER PUBLICATIONS

Yoshida, M. et al., *Writing performance if IND/SV combination heads with sub micron track Width*, Data Storage Components Bus. Group., Nagano, Japan.

* cited by examiner

Primary Examiner—Robert S. Tupper
(74) Attorney, Agent, or Firm—Lumen Intellectual Property Services, Inc.

(57) ABSTRACT

In a T-head design, it is desirable to reduce the side-writing that occurs during the write operation. The side-writing causes the track width to increase and therefore reduces the track density that can be achieved. The side-writing is caused by certain corners of the T-head producing extraneous fluxes over the magnetic disk. The extraneous fluxes write to the magnetic disk, causing the track width to be increased. The present invention recesses part of the T-head from the air bearing surface by a focused ion beam milling, an ion milling, or an etching process. The extraneous fluxes are therefore recessed from the magnetic disk by a shallow distance sufficient to prevent writing to the magnetic disk, but not so great a distance to inhibit the flux carrying capacity of the structure to the actively writing pole tip.

19 Claims, 6 Drawing Sheets

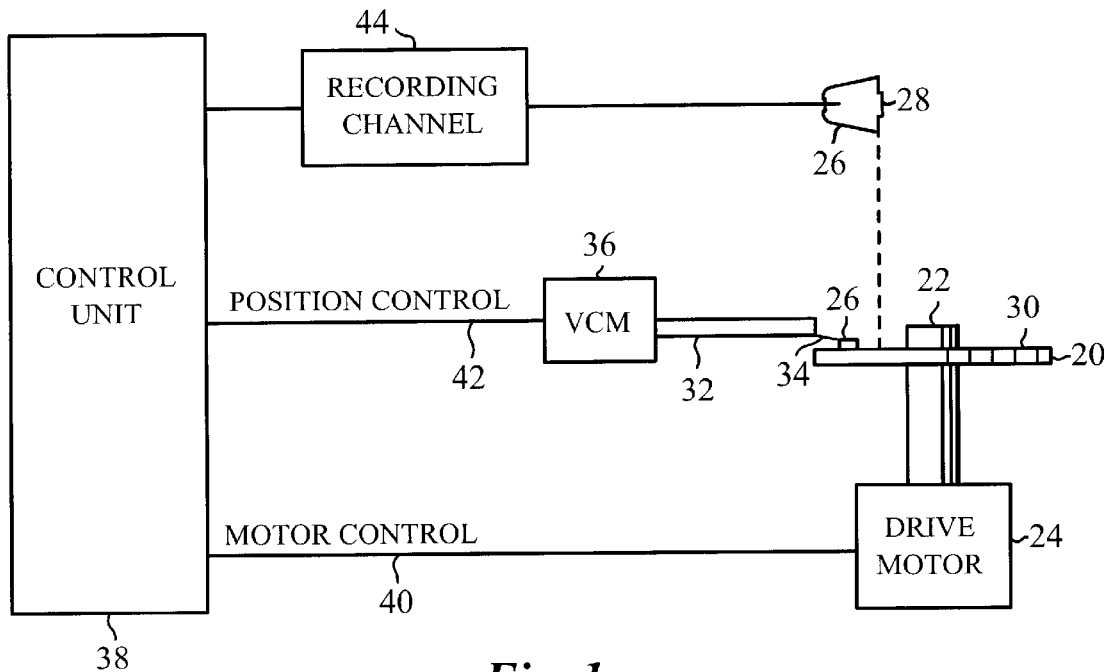
Fig. 1
(Prior Art)
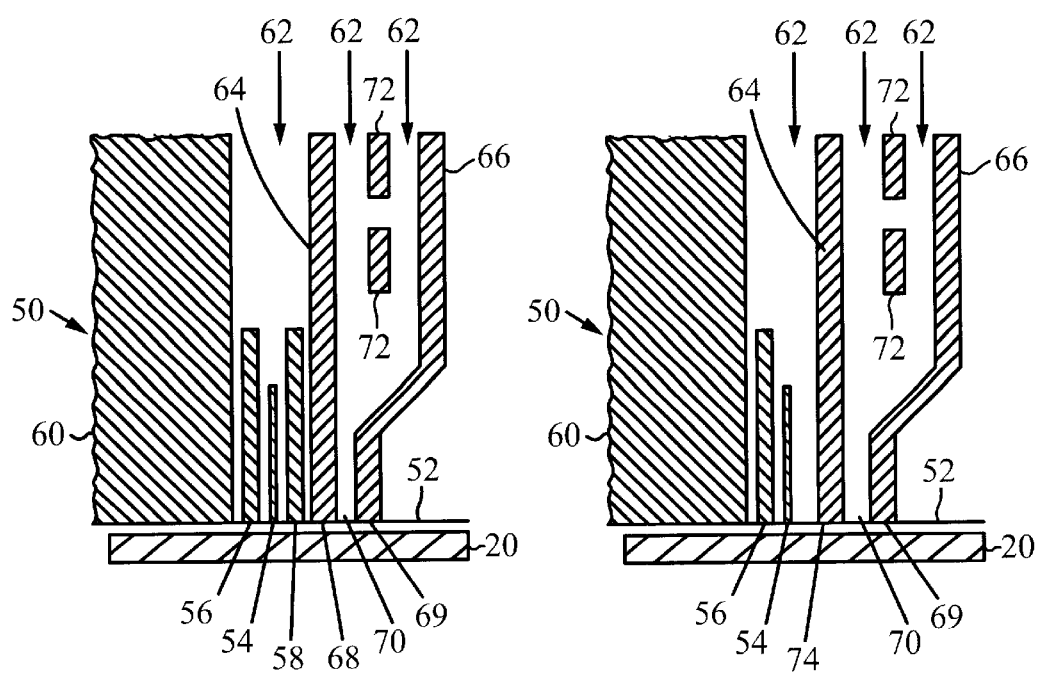
Fig. 2A
(Prior Art)
Fig. 2B
(Prior Art)

SHALLOW RECESSED T-HEAD WITH REDUCED SIDE-WRITING AND METHOD FOR MAKING THE SAME

FIELD OF THE INVENTION

The present invention relates to write heads for magnetic disk drives and more particularly to methods of reducing side writing of the write head in magnetic disk drives.

DESCRIPTION OF THE RELATED ART

Magnetic head disk drive systems have been widely accepted in the computer industry as a cost-effective form of data storage. In a magnetic disk drive system, a magnetic recording medium in the form of a disk rotates at high speed while a magnetic read/write transducer, referred to as a magnetic head, "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

The dimensions of a slider's transducer can be a substantial factor in defining the number of data tracks that may be written onto a magnetic disk. Specifically, the effective magnetic width of the pole tip region of the magnetic transducer is directly related to the physical width, as well as to other factors such a flying height above the rotating disk, in the case of flying head technology. In turn, the transducer's magnetic width relates to the width of each track written to the storage medium. If the width of the pole tip region of the transducing member is made relatively smaller, a greater number of tracks can be written in the same recording area. Therefore, the width of the pole tip region of a magnetic transducer is inversely related to track density of the magnetic storage medium.

However, the reduction in width of the pole tip also limits the amount of magnetic flux flowing to the pole tip for writing operations. One solution to this problem is to create a pole tip that has a "T" like shape, herein referred to as the T-head. The wider part of the "T" conducts magnetic flux to the bottom of the "T". This enables sufficient magnetic flux to flow into the pole tip, which is the bottom tip of the "T" like structure, for writing operations.

Yet, this T-head configuration has its own problems. The top part of the T-head, which is the horizontal part, has four corners exposed to the air bearing surface, directly over the magnetic disk that is being written. These corners create extraneous magnetic fluxes, which causes side-writing and therefore reduces the track density.

A need therefore exists for providing a T-head with significantly reduced side-writing during the write operation of the magnetic transducer.

SUMMARY OF THE INVENTION

A principle objective of the present invention is to provide a T-head with reduced side-writing and a method for making a T-head with reduced side-writing.

In view of the foregoing objects, the present invention provides a T-head design that recesses portions of the T-head to increase the distance between the recessed portion of the T-head and the magnetic disk. This would reduce the side-writing of the T-head. The method for recessing a portion of the T-head is performed in a focused ion beam (FIB) operation.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which:

FIG. 1 is a simplified block diagram of a magnetic disk storage system;

FIGS. 2A and 2B are cross-sectional views of MR read/inductive write magnetic transducers;

DETAILED DESCRIPTION OF THE EMBODIMENTS

Figure 3:
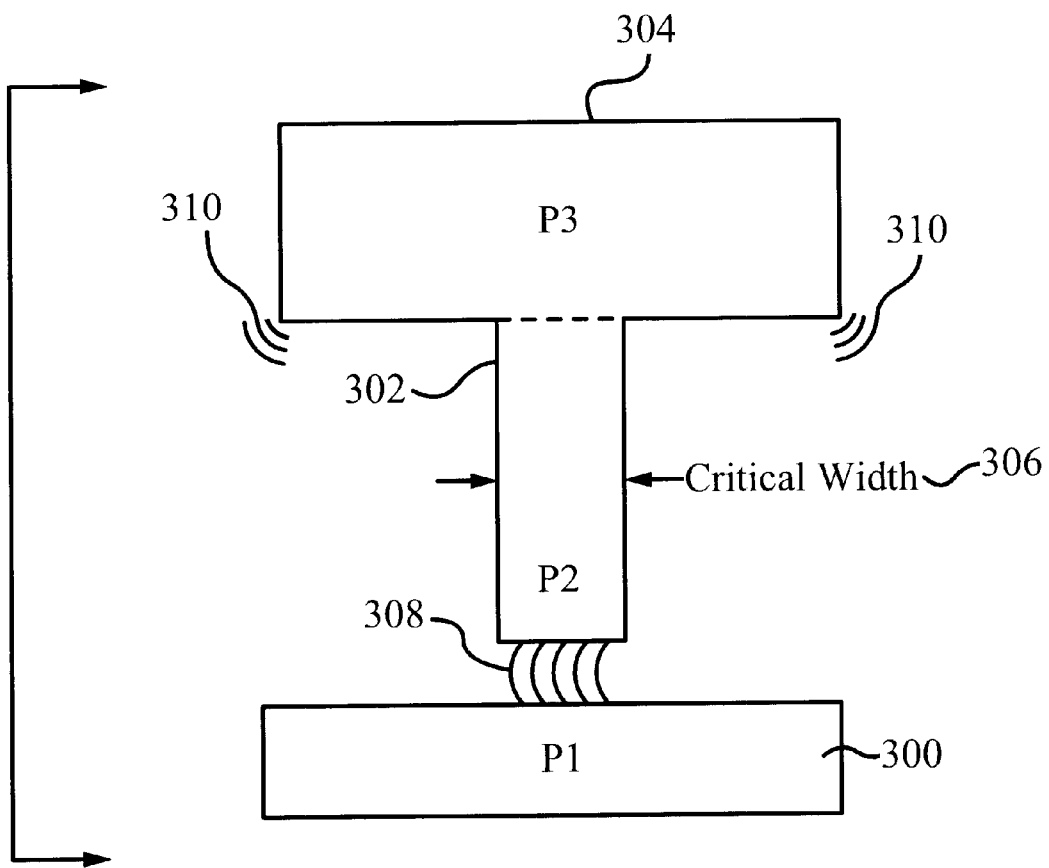
FIG. 3 is an illustration showing a plan view of an embodiment of the present invention.

Although the invention is described as embodied in a magnetic disk storage system, the invention also applies to other magnetic recording systems and applications using a sensor to detect a magnetic field, such as magnetic tape recording systems for example.

Referring to prior art FIG. 1, a magnetic disk storage system comprising at least one rotatable magnetic disk 20 is supported on a spindle 22 and rotated by a disk drive motor 24 with at least one slider 26 positioned on the disk 20. Each slider 26 supports one or more magnetic read/write transducers 28, typically referred to as read/write heads. The magnetic recording media on each disk is in the form of a thin film on which are recorded an annular pattern of concentric data tracks (not shown) on disk 20. As the disks rotate, the sliders 26 are moved radially in and out over the disk surface 30 so that the heads 28 may access different portions of the disk where desired data is recorded. Each slider 26 attaches to an actuator arm 32 by means of a suspension 34. The suspension 34 provides a slight spring force which biases the slider against the disk surface 30. Each actuator arm 32 attaches to an actuator means 36. The actuator means as shown in FIG. 1 may be a voice coil motor (VCM), for example. The VCM comprises a coil moveable within a fixed magnetic field. The controller supplies motor current signals to control the direction and acceleration of the coil movements.

During operation of the disk storage system, the rotation of the disk 20 generates an air bearing between the slider 26 and the disk surface 30 which exerts an upward force or lift on the slider. The air bearing thus counterbalances the slight spring force of the suspension 34 and supports the slider off and slightly above the disk surface a small, substantially constant spacing during operation.

The various components of the disk storage system are controlled in operation by control signals generated by control unit 38, such as access control signals and internal clock signals. Typically, the control unit 38 comprises logic control circuits, storage means and a microprocessor, for example. The control unit 38 generates control signals to control various system operations such as drive motor control signals on line 40 and head position and seek control signals on line 42. The position control signals 42 provide the desired current profiles to optimally move and position a selected slider 26 to the desired data track on the associated disk 20. A recording channel 44 communicates read and write signals to and from the read/write heads 28.

The above description of a typical magnetic disk storage system, and the accompanying illustration of FIG. 1 are for representation purposes only. Disk storage systems may contain a large number of disks and actuators, and each actuator may support a number of sliders.

Referring now to prior art FIGS. 2A and 2B, a portion of a giant magnetoresistive (G)MR read/inductive write magnetic head or magnetic head assembly or head 50 is shown in transducing relationship with a rotating magnetic disk 20 such that the head air bearing surface 52 (ABS) is disposed in facing relationship with and slightly above the disk recording surface. Generally, such a magnetic head assembly 50 includes an (G)MR read assembly and an inductive write assembly formed adjacent to one another on a substrate surface. The substrate surface is typically the vertical surface forming the trailing end of the slider 26 carrying the magnetic head. A traditional MR read assembly comprises an anisotropic magnetoresistive (AMR) sensing element 54 fabricated of a ferromagnetic material, such as nickel-iron (NiFe) alloy, for example, which is enclosed by first and second magnetic shield elements 56 and 58, respectively. In a more advanced giant magnetoresistive (GMR) head, the magnetic sensing element 54 comprises a multilayer magnetic structure, including magnetic bias layers, of the type described in commonly assigned U.S. Pat. No. 4,785,366 or of the type described in commonly assigned U.S. Pat. No. 5,206,590. This multilayer magnetic structure consists of a conducting layer sandwiched by two magnetic layers, one of which has a fixed magnetization. The other magnetic layer's magnetization is free to change, affected by an external magnetic field. By utilizing the spin direction of electrons transversing these three layers, a giant MR effect is created. The shield elements 56 and 58 are generally made of a highly permeable magnetic material, such as NiFe or Sendust, a trialloy of aluminum-silicon-iron. The magnetic shield elements 56 and 58 minimize or eliminate magnetic interferences from affecting the (G)MR sensing element 54 thereby producing extraneous electrical pulses and improve the resolution of the sensor thereby allowing more closely spaced data patterns to be read. Conductive leads, of tantalum (Ta) or copper (Cu) or other suitable conductive material, attached electrically at the end portions of the (G)MR element 54 couple the (G)MR sensing element to external circuitry to provide a means for sensing the resistance of the (G)MR sensing element.

The (G)MR read assembly is formed by well-known vacuum deposition techniques, such as sputter deposition, for example, on the substrate 60. Layers 62 of insulating material surround and insulate the various elements of the (G)MR assembly from each other. For example, the layers 62 are made from silicon dioxide ($SiO_2$) or aluminum oxide ($Al_2O_3$).

The inductive write assembly comprises a lower or first pole piece 64 and an upper or second pole piece 66. The first and second pole pieces 64, 66 are made of a highly permeable magnetic material such as NiFe, for example. The first and second pole pieces 64, 66 form a magnetic circuit magnetically connected together at a back gap portion (not shown) with the first and second pole tips 68, 69 forming a magnetic gap 70 at the air bearing surface 52. One or more layers of electrical conductors 72, generally made of Cu, for example, form a write coil 72 disposed between the first and second pole pieces 64, 66. The write coil 72 also connects to external circuitry via conductive leads. The pole pieces 64, 66 and the write coil conductors are fabricated by well-known processes such as electro-plating or sputter deposition, for example. Layers 62 of insulating material electrically insulate the pole pieces from the write coil and the (G)MR read assembly. In addition, a capping layer 62 of insulating and protective material covers the entire assembly.

The magnetic head assembly 50 shown in FIG. 2a is sometimes referred to as a "piggyback" head. FIG. 2b shows an alternate configuration referred to as a "merged" head where the second (G)MR magnetic shield element 58 is merged with the inductive assembly first pole piece 64 to form a single element 74 which performs both functions.

FIG. 3 illustrates an embodiment of the present invention. A T-head is shown illustrating the fluxes that occur in the three pole elements. Pole P1 300 is analogous to the first pole piece 64 in FIG. 2B and pole P2 302 is analogous to the second pole piece 66 in FIG. 2B. Pole P3 304 is not shown in FIG. 2B but is also referred to as third pole piece. The flux 308 that is created between the P1 300 and P2 302 pole tips is used to write data on the magnetic disk. The width of pole tip P2 306 determines the track width which also directly affects the track density of the magnetic disk. It is desirable to maximize the track density of the magnetic disk and therefore minimize the width of pole tip of pole P2 302. However, as pole P2 302 gets narrower and narrower, there is less and less material to conduct magnetic flux to the tip to create the magnetic flux 308 that writes the disk.

To solve this problem, pole P3 304 is used to assist in conducting magnetic flux to pole P2 302 for creating the magnetic flux 308 that writes the disk. For the same height in Pole P2 302 and Pole P3 304, if Pole P3 304 is wider than pole P2 302, it can therefore carry more magnetic flux than pole P2 302. However, the corners of pole tip P3 creates extraneous flux 310 that is causing side-writing on the magnetic disk. This side-writing in effect increases the track width of the magnetic transducer and requires greater spacing between tracks to prevent erroneous readings during the read-back operation.

The present invention solves this problem by recessing the tip of pole P3 304 by approximately 5–10 nanometers. This sets the tip pole P3 304 back from the magnetic disk, thereby significantly reducing the ability of the extraneous magnetic flux 310 to write to the magnetic disk.

Figure 4:
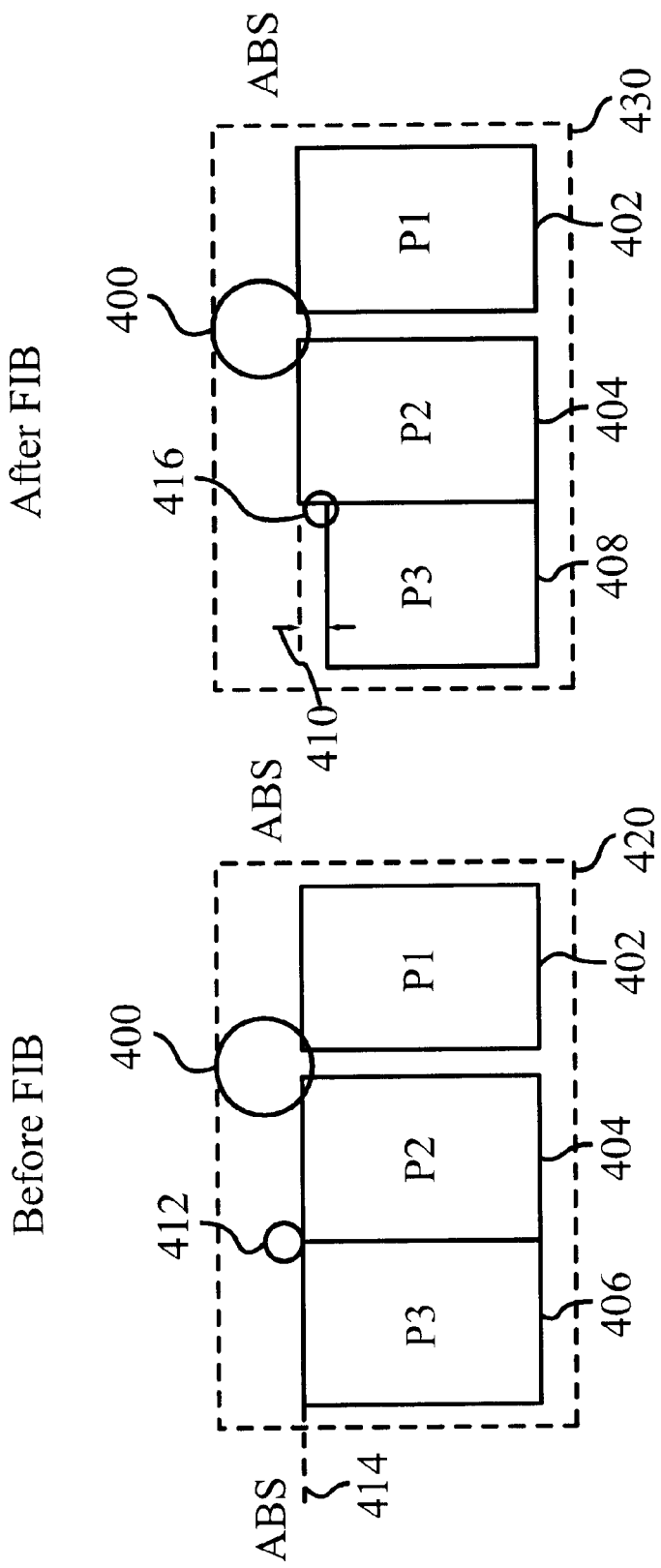
FIG. 4 is an illustration showing a side view of an embodiment of the present invention.

FIG. 4 shows a side view of the present invention which illustrates clearly that the pole P3 408 is shallow recessed. A prior art T-head 420 is shown and a T-head 430 of the present invention, with the pole P3 408 recessed which is also shown. The magnetic flux 400 used for the writing of data is shown between the tips of poles P1 402 and P2 404. The magnetic flux 412 caused by the corners of pole tip P3 406 is also shown. The extraneous magnetic flux 412 at the corners of pole tip P3 is causing the side-writing.

The present invention shows a T-head 430 with the pole P3 408 tip shallow recessed from the tip of pole P2 404. Because of the increased distance 410 between the extraneous magnetic flux 416 generated by the recessed corners of pole P3 408 and the magnetic disk (not shown), the extraneous magnetic flux 416 is much less effective in side-writing on the magnetic disk.

The present invention minimizes the recess of pole P3 408 tip to a distance just enough to prevent extraneous flux from writing to the magnetic disk. Through experimental data, it has been found that with a recess of 5 to 10 nanometers, the effects of side-writing can be reduced to a point where the track width is determined by the width of P2. Any further recess has produced no significant increase in the reduction of side-writing. However, as the size of T-heads reduce, the minimum amount of recess of pole P3 408 tip will also decrease.

Figure 5:
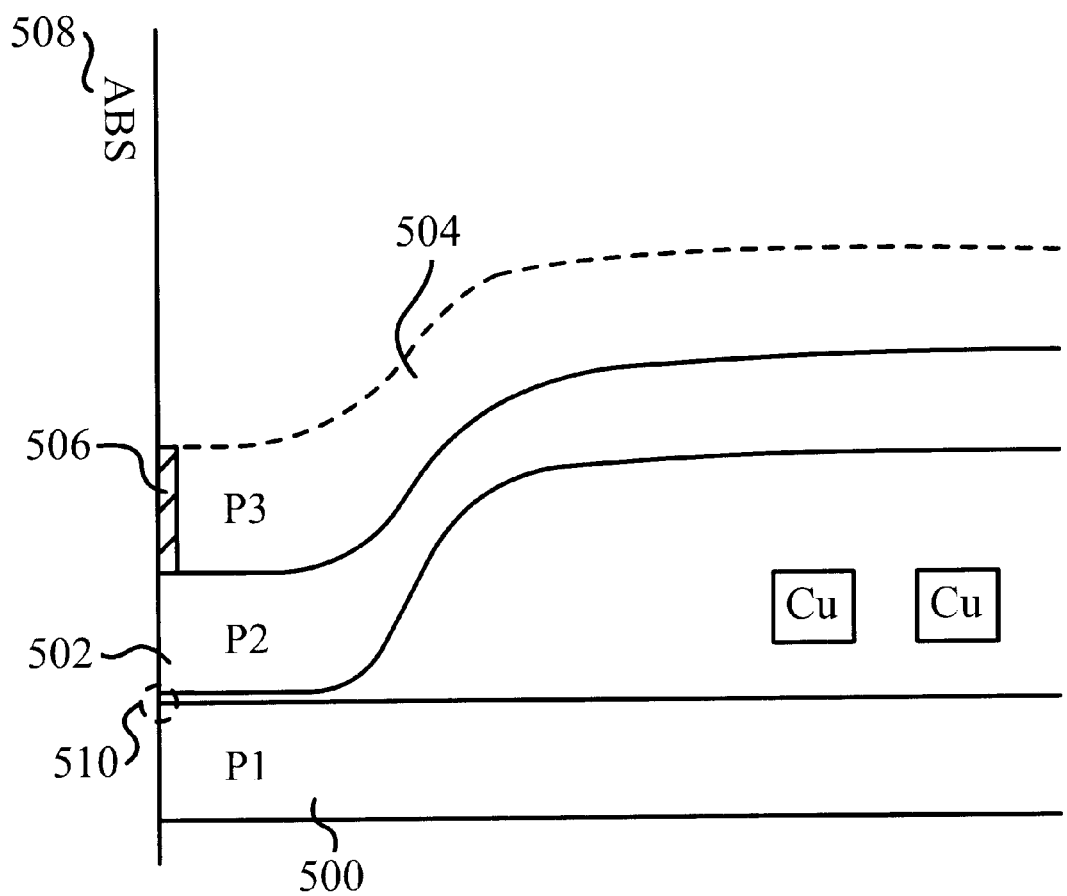
FIG. 5 is an illustration showing an overall view of an embodiment of the present invention.

FIG. 5 illustrates a cross section of a write head of the present invention. The pole tips of poles P1 500, P2 502, and P3 504 are shown in context of the write head. Pole P1 500 is on the bottom. Slightly on top of that is pole P2 502, which is connected to pole P3 504. Pole P3 504 is connected to P2 502 in order to assist in conducting magnetic flux to the pole tip of pole P2 502 to create enough magnetic flux 510 between tips of poles P2 502 and P1 500 to write data on the magnetic disk. As the illustration shows, the pole tip P3 is recessed from the tip of pole P2 502. The recess is shown as area 506. This recess of pole tip P3 from the tip of pole P2 502 significantly reduces side-writing. The present invention recesses the pole tip of pole P3 504 by 5 to 10 nanometers. It has been shown experimentally that recessing by more than 5 to 10 nanometers does not yield any significant increase in the reduction of side-writing compared to recessing only by 5 to 10 nanometers.

The ability of the pole P3 to conduct magnetic flux to pole tip of pole P2 502 is also inversely related to the amount of recession 506 in the pole tip of pole P3 504. As FIG. 5 illustrates, the recess in the pole tip of pole P3 504 decreases the contact area between poles P2 502 and P3 504. This reduces the effectiveness of pole P3 504 to conduct magnetic flux to the pole tip of pole P2 502.

Figure 6:
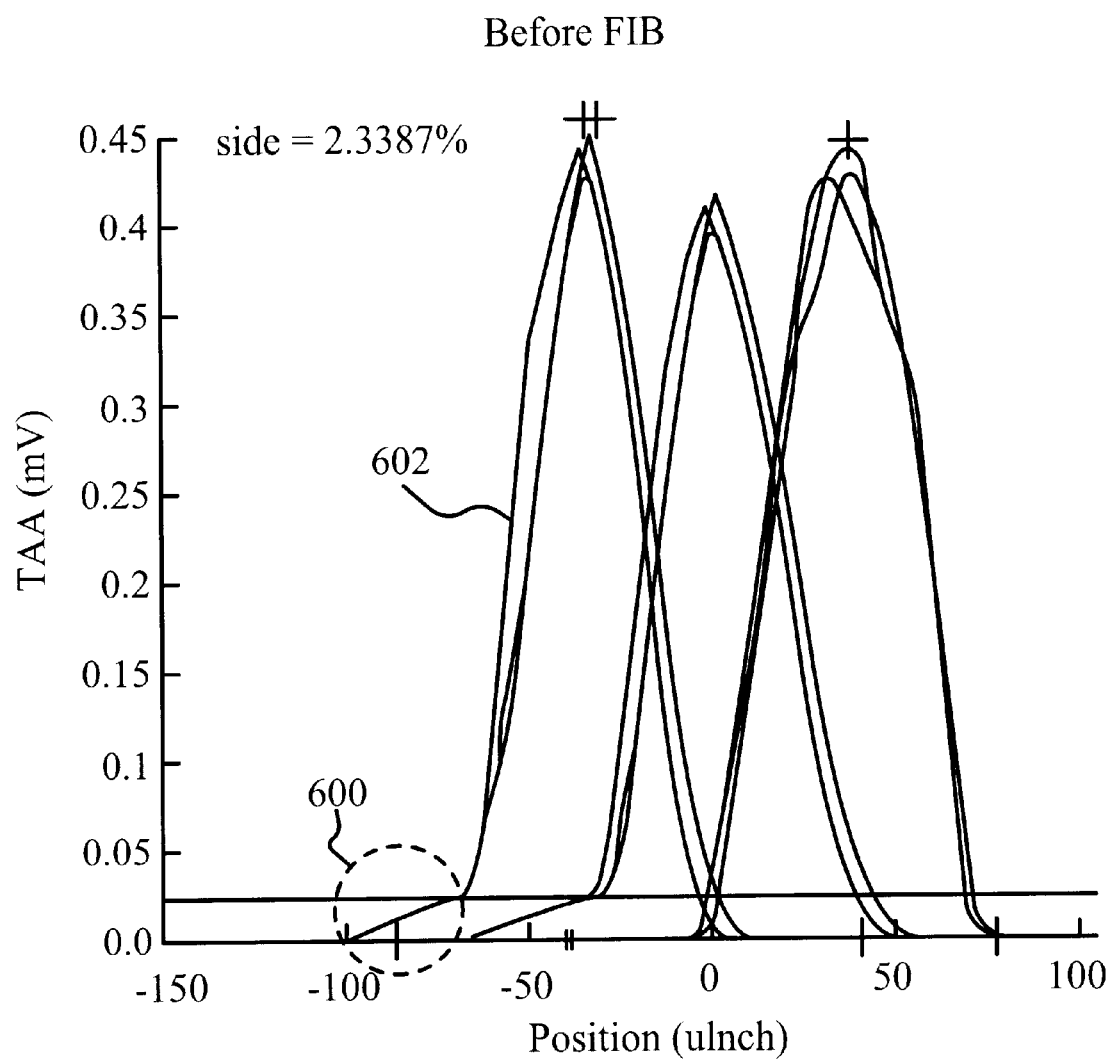
FIG. 6 is a graph illustrating the effects of side-writing before the recessing of P3.

FIG. 6 illustrates a graph showing the effects of side-writing before the recessing of P3. The high tails 600 on the leading edge of the track profiles 602 illustrates the side-writing that is caused by the extraneous magnetic fluxes at the corners of pole tip P3.

Figure 7:
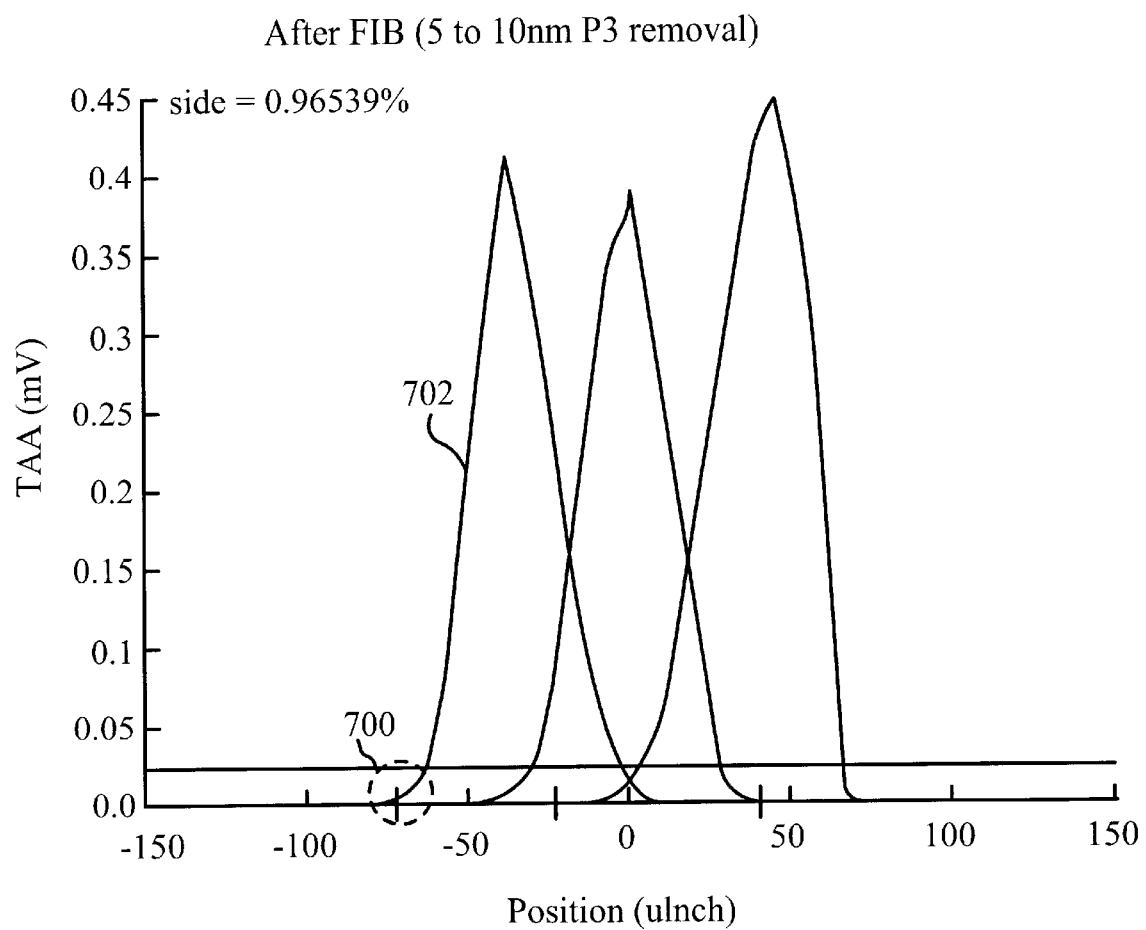
FIG. 7 is a graph illustrating the reduction in effects of side-writing after the recessing of P3.

FIG. 7 illustrates a graph showing the reduced side-writing after the recessing of pole tips of pole P3 by 5 to 10 nanometers. The tails 700 on the leading edge of the track profiles 702 are much lower signifying a much reduced side-writing by the corners of pole tips of pole P3.

The reduction of side-writing by recessing the pole tip P3 to beyond 5 to 10 nanometers will become less and less significant. Therefore, it is unnecessary to trim pole tip P3 beyond 10 nanometers. This is in contrast to prior art recessing of the P3 to 1 micron. The manufacturing throughput of prior art recessing of the P3 by 1 micron is approximately 5 seconds per write head which translates into approximately 4 hours of focused ion beam milling time of the total wafer handling budget of approximately 8 hours per wafer. In contrast, the present invention has a theoretical manufacturing throughput of approximately 0.002 seconds per write head element which translates into approximately 12 seconds of focused ion beam milling time per wafer reducing the total wafer handling budget to approximately 4 hours.

The recessing of the tip of pole P3 can be performed by other manufacturing processes besides focused ion beam milling (FIB) as indicated above. The advantage of FIB milling is that it does not require pattern masking. Alternative manufacturing processes include ion milling and chemical or reactive ion etching (RIE) processes which require pattern masking but allows batch processing of head rows.

A wafer is cut into head rows and each head row is masked using lithography processes, leaving only the tip of pole P3 exposed on the surface of the head row. Each head row is exposed to ion particle bombardment or reactive etchants to remove the desired amount of material to recess the tip of pole P3. The masked areas of the heads are protected from the ion particle bombardment or the reactive etchants and therefore the material beneath the mask is not removed.

The shallow recessing of the pole tip of pole P3 leaves a relatively large area of pole P3 in contact with the pole P2. This large area of contact provides a good conduit between pole P3 and the P2 pole tip allowing ample magnetic flux to flow to the P2 pole tip for writing operations.

It will be clear to one skilled in the art that the above embodiment may be altered in many ways without departing from the scope of the invention. Accordingly, the scope of the invention should be determined by the following claims and their legal equivalents.

What is claimed is:

1. A method of producing a write head with reduced side-writing during the write operation of a magnetic disk drive wherein the write head comprises a first pole piece, a second pole piece, a non-magnetic layer between the first and second pole pieces, and a third pole piece wherein the third pole piece conducts magnetic flux to the second pole piece, the method comprising the step of:

shallow recessing the third pole piece about 5 to 10 nanometers from a surface defined by a tip of the second pole piece such that the shallow recess of 5 to 10 nanometers of the third pole piece affects a significant reduction in extraneous magnetic flux created by one or more corners of the third pole piece thereby substantially prevents the extraneous magnetic flux from writing to the magnetic disk.

2. The method of claim 1 wherein the write head is characterized as a T-head.

3. The method of claim 1 wherein the third pole piece is in contact with the second pole piece.

4. The method of claim 1 wherein the third pole piece is made from material selected from a group consisting of iron, nickel, cobalt, and alloys thereof.

5. The method of claim 1 wherein the shallow recessing step is realized via a focused ion beam milling process.

6. The method of claim 1 wherein the shallow recessing step is realized via an ion milling process.

7. The method of claim 1 wherein the shallow recessing step is realized via an etching process.

8. A write head with reduced side-writing comprising:
a first pole piece;
a second pole piece;
a non-magnetic layer between the first and second pole pieces; and
a third pole piece attached to the second pole piece for conducting magnetic flux to the second pole piece, wherein the third pole piece is shallow recessed about 5 to 10 nanometers from a surface defined by a tip of the second pole piece and wherein the shallow recess affects a significant reduction in extraneous magnetic flux created by, one or more corners of the third pole piece, thereby substantially prevents the extraneous magnetic flux from writing to a magnetic disk.

9. The write head as claimed in claim 8 wherein the shallow recess is generated by way of a focused ion beam milling process.

10. The write head as claimed in claim 8 wherein the shallow recess is generated by way of an ion milling process.

11. The write head as claimed in claim 8 wherein the shallow recess is generated by way of an etching process.

12. A magnetic read/write head having a write head wherein the write head comprises:
   a first pole piece;
   a second pole piece;
   a non-magnetic layer between the first and second pole pieces; and
   a third pole piece attached to the second pole piece for conducting magnetic flux to a tip of the second pole piece, wherein the third pole piece is shallow recessed about 5 to 10 nanometers from a surface defined by the tip of the second pole piece such that extraneous magnetic flux created by one or more corners of the third pole piece being significantly reduced.

13. The magnetic read/write head according to claim 12 wherein the shallow recess is generated by way of a focused ion beam milling process.

14. The magnetic read/write head according to claim 12 wherein the shallow recess is generated by way of an ion milling process.

15. The magnetic read/write head according to claim 12 wherein the shallow recess is generated by way of an etching process.

16. A hard disk drive comprising:
   a magnetic disk;
   a record head;
   a write head comprising:
      a first pole piece;
      a second pole piece;
      a non-magnetic layer between the first and second pole pieces; and
      a third pole piece attached to the second pole piece for conducting magnetic flux to the second pole piece, wherein the third pole piece is shallow recessed about 5 to 10 nanometers from a surface defined by a tip of the second pole piece and wherein the shallow recess affects a significant reduction of side-writing to the magnetic disk during the write operation.

17. The hard disk drive according to claim 16 wherein the shallow recess is generated by way of a focused ion beam milling process.

18. The hard disk drive according to claim 16 wherein the shallow recess is generated by way of an ion milling process.

19. The hard disk drive according to claim 16 wherein the shallow recess is generated by way of an etching process.

* * * * *